United States Patent
Rozycki et al.

(10) Patent No.: US 8,708,619 B2
(45) Date of Patent: Apr. 29, 2014

(54) POWER TOOL WITH INTEGRAL PENCIL SHARPENER

(75) Inventors: Stanley Rozycki, Stuart, FL (US); Donald Nordstrom, Stuart, FL (US)

(73) Assignee: Stanley Rozycki, Port St. Lucie, FL (US)

( * ) Notice: Subject to any disclaimer, the term of this patent is extended or adjusted under 35 U.S.C. 154(b) by 847 days.

(21) Appl. No.: 12/833,967

(22) Filed: Jul. 10, 2010

(65) Prior Publication Data

US 2012/0009031 A1  Jan. 12, 2012

(51) Int. Cl.
*B25F 3/00* (2006.01)
*B23B 45/00* (2006.01)

(52) U.S. Cl.
USPC .................................. 408/26; 7/158; 30/451

(58) Field of Classification Search
USPC ........... 30/451, 642; 7/158, 165, 157; 408/24, 408/25, 35
See application file for complete search history.

(56) References Cited

U.S. PATENT DOCUMENTS

| 5,276,929 | A * | 1/1994 | Mitchell | 7/158 |
| 6,092,293 | A * | 7/2000 | Donaldson | 30/457 |
| 6,237,656 | B1 | 5/2001 | Whitehead et al. | |
| 6,473,976 | B1 * | 11/2002 | Cocchiarella | 30/453 |
| 7,066,692 | B2 * | 6/2006 | Kuhn | 408/124 |
| 7,654,179 | B2 * | 2/2010 | Parrish et al. | 83/13 |
| 2005/0268471 | A1 | 12/2005 | Ralston | |
| 2008/0135272 | A1 | 6/2008 | Wallgren | |
| 2010/0065293 | A1 | 3/2010 | Lohr | |

* cited by examiner

*Primary Examiner* — Andrea Wellington
*Assistant Examiner* — Mohammad Nourbakhsh
(74) *Attorney, Agent, or Firm* — Leason Ellis LLP

(57) ABSTRACT

In one embodiment of the present invention, a power tool includes a housing having a first opening formed therein with a motor being contained within the housing. The tool includes a device for sharpening a writing implement. The sharpening device is at least partially contained within the housing and accessible through the first opening which permits the writing implement to be inserted into the sharpening device. The sharpening device is operatively connected to the motor such that operation of the motor drives the sharpening device.

13 Claims, 3 Drawing Sheets

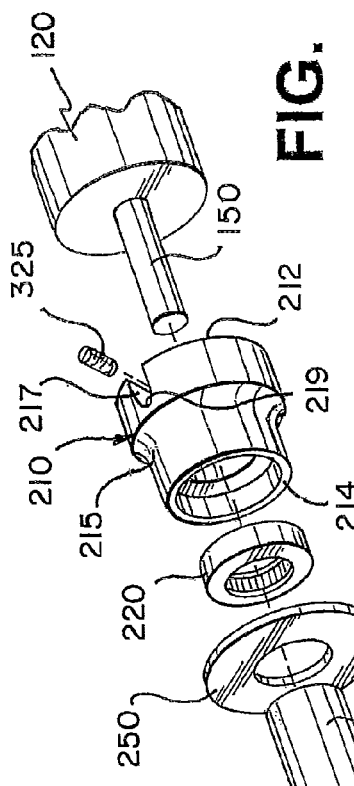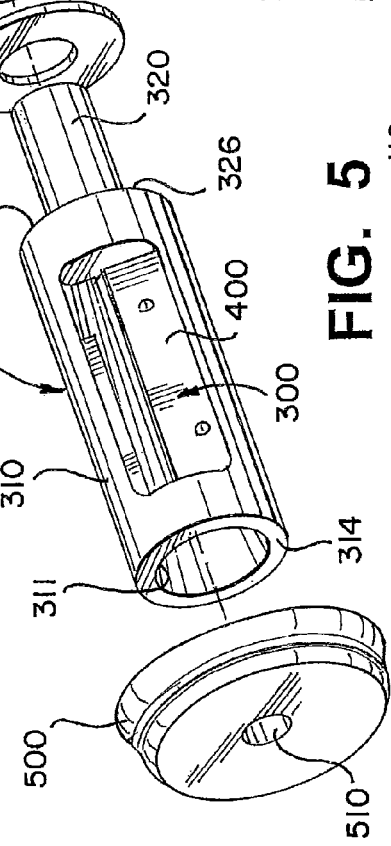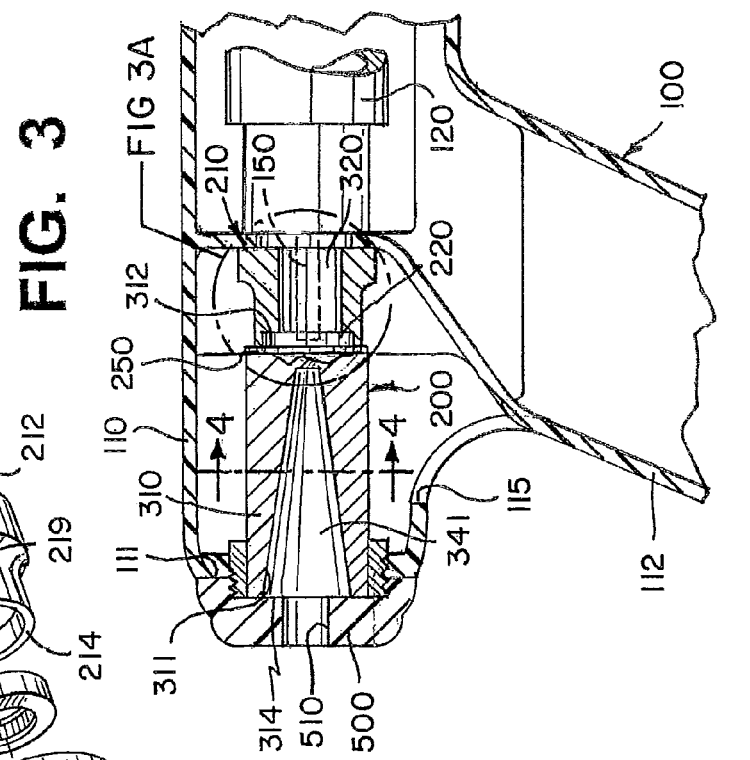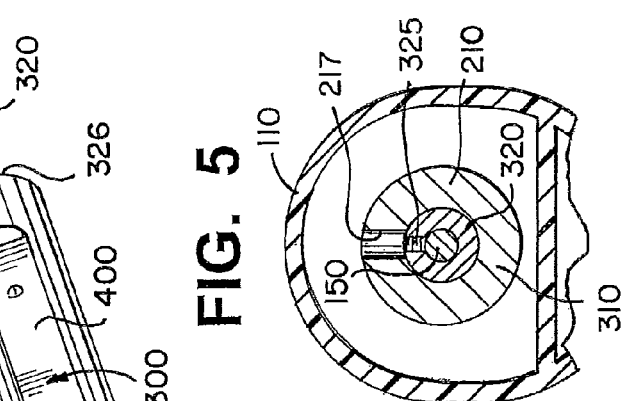

FIG. 6
FIG. 7
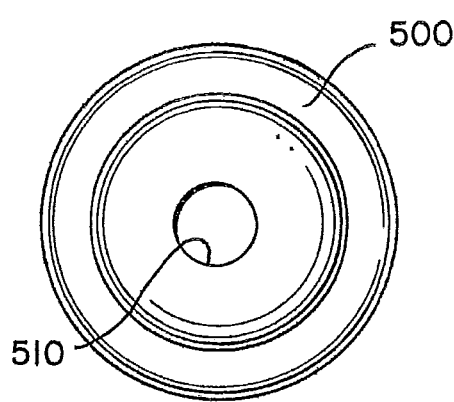
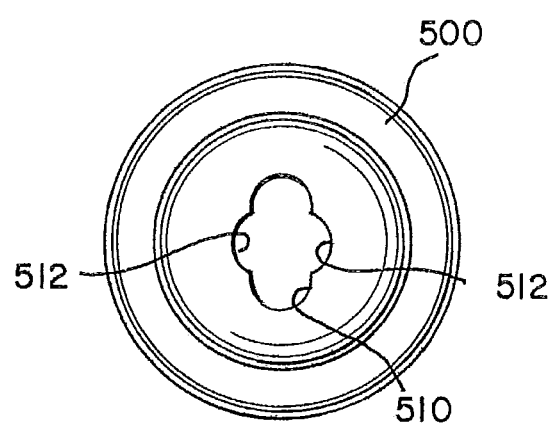

POWER TOOL WITH INTEGRAL PENCIL SHARPENER

TECHNICAL FIELD

The present invention relates to power tools, such as drills and the like, and in particular, to a power tool that includes an integral pencil sharpener to allow a worker to sharpen a pencil at the work site without the need for a device separate from the power tool.

BACKGROUND

A power tool can be generally thought of as a tool that is powered by an electric motor, a compressed air motor, an internal combustion engine, direct burning of fuels and propellants. Power tools can be classified as either stationary or portable (i.e., a handheld device). Power tools are used in a wide variety of settings including in industry, in construction, and around the house for driving, drilling, cutting, shaping, sanding, grinding, polishing, painting, and heating. Stationary power tools are also sometimes referred to as machine tools and can come in a number of different forms, including drill presses, table saws, etc. and are designed to be fixed in one location during use. In contrast, portable power tools are mobile and can be used in different settings where movement and repositioning of the tool is necessary. For example, common power tools include but are not limited to a power drill, various types of saws, a router, an electric sander, a lathe, an electric staple gun, etc.

In terms of electric or motor driven power tools, the tools can either be wired and plugged into an electrical outlet or they can be of a cordless type and powered by a battery pack or the like. Cordless power tools offer maximum versatility as they allow the worker maximum mobility and allow the power tool to be positioned at a number of different positions without worrying about a power cord, etc.

Typically, at a worksite, more than one tool is being used to complete a project. For example, a saw, hammer and power drill can all be used at the same time to cut wood and fasten cut pieces of wood together. In addition, it is commonplace for a worker to have some type of writing implement at the worksite. For example, the most common writing implement is a carpenter pencil which is a pencil that has a body with a rectangular or elliptical cross-section to stop it from rolling or blowing away in a wind gust. Carpenter pencils offer a better grip than a standard pencil. They have a rectangular or elliptical core which allows thin or thick lines to be drawn by simply rotating the pencil. Thin lines are required for high precision markings, and when it is important to erase the markings later. There are times when thick markings are needed to make marks on a rough, course surface. The pencil must be robust enough to survive in busy construction environment.

As is known, pencil sharpeners include various devices that sharpen wood/composite pencils and also often times house the pencil shavings and chipped lead or graphite for later disposal. Prior portable pencil sharpeners are dependent upon manual manipulation to create the sharpened pencil tip. Small, battery powered units are too bulky to be carried on the body of the user and are not convenient to use. Pencils sharpened by manual methods, such as a knife, do not easily produce finely shaped tapered points and can involve a degree of risk of injury.

Carpenter pencils are typically manually sharpened with a knife, because their shapes make them unable to fit into a mechanical pencil sharpener and also because ordinary rotating sharpeners sharpen the core into round and not into desired flat shape.

There is therefore, a need for a pencil sharpener that can be powered by an external source, such as a portable power tool. U.S. Pat. No. 6,237,656 describes a pencil sharpener bit that is for use with a portable electric powered drill. However, this solution is still not entirely satisfactory and fails to address all the needs since the drill bit is a separate part that needs to be attached to the electric powered tool and needs to be safely stored when not in use, etc. What is needed is a means for sharpening a pencil (carpenter's pencil) that is integral to the power tool itself.

SUMMARY

In one embodiment of the present invention, a power tool includes a housing having a first opening formed therein with a motor being contained within the housing. The tool includes a device for sharpening a writing implement. The sharpening device is at least partially contained within the housing and accessible through the first opening which permits the writing implement to be inserted into the sharpening device. The sharpening device is operatively connected to the motor such that operation of the motor drives the sharpening device.

In another embodiment, a power drill includes a housing having a first opening formed therein along a rear portion of the housing and a second opening formed in a forward portion of the housing. The power drill includes a drill chuck that is coupled to the forward portion of the housing and extends outwardly therefrom and is configured to receive a drill bit. The drill also includes a motor contained within the housing. The motor has a rotating drive shaft, with the drill chuck being operatively coupled to the motor. The power drill also has an internal device for sharpening a writing implement. The sharpening device is at least partially contained within the housing and accessible through the first opening which permits the writing implement to be inserted into the sharpening device. The sharpening device is operatively connected to the motor such that operation of the motor drives the sharpening device in such a way to permit sharpening of the writing implement.

These and other aspects, features and advantages shall be apparent from the accompanying Drawings and description of certain embodiments of the invention.

BRIEF DESCRIPTION OF THE DRAWINGS

FIG. 2 is an exploded perspective view of a pencil sharpener assembly that is an integral part of the power tool;

FIG. 3 is a cross-sectional view of the pencil sharpener assembly in an assembled condition within a rear of a housing of the power tool;

FIG. 4 is a cross-sectional view taken along the line 4-4 of FIG. 3;

FIG. 5 is a cross-sectional view taken along the line 3A-3A of FIG. 3A;

FIG. 6 is a top plan view of an end cap according to a first embodiment; and

FIG. 7 is a top plan view of an end cap according to a second embodiment.

DETAILED DESCRIPTION OF CERTAIN EMBODIMENTS OF THE INVENTION

Figure 1:
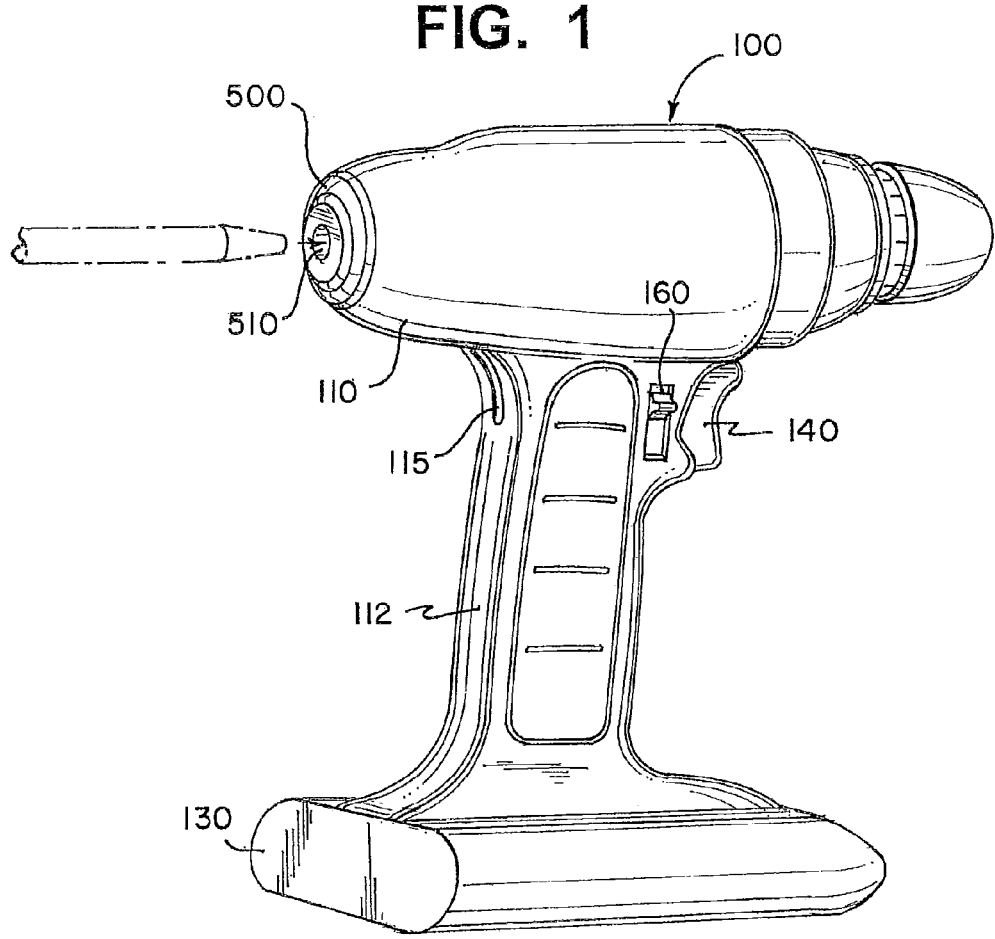
FIG. 1 is a rear and side perspective view of a portable power tool with integral pencil sharpener according to one exemplary embodiment of the present invention.

In accordance with a first embodiment of the present invention, a portable power tool 100 with integral pencil sharpener 200 is shown in FIGS. 1-7. The illustrated power tool 100 is in the form of a power drill (e.g., a cordless power drill) that includes a housing 110. The housing 110 of the tool 100 protects the user from the working parts of the tool 100 and provides a gripping surface with which to hold the tool 100 during operation thereof. The housing 110 includes a handle portion 112 that is used to hold the tool 100 during operation thereof.

When the tool 100 is in the form of a drill, the tool 100 is fitted with a rotating cutting implement (not shown), usually a drill bit, for drilling holes in various materials. The cutting implement is gripped by a chuck at one end of the drill (tool 100) and rotated while pressed against the target material. The tip of the cutting tool does the work of cutting into the target material.

The tool 100 includes a controllable motor 120 that is contained within the housing 110 and is operatively connected to a power source 130. As previously mentioned, the tool 100 can be in the form of a cordless device in which case the power source 130 is a battery pack or the power source 130 can be an electrical outlet in which case a power cord connects the working components to the power source. The tool 100 can also have one or more controllers (not shown), such as a printed circuit board, and includes an actuator 140 for controllably operating the tool 100. The actuator 140 can be in the form of an on/off trigger that is pressed and held down to operate the tool 100. When the tool 100 is in the form of a power drill, it also includes a reversing switch 160 for changing the rotation direction of the drill bit.

Figure 3A:
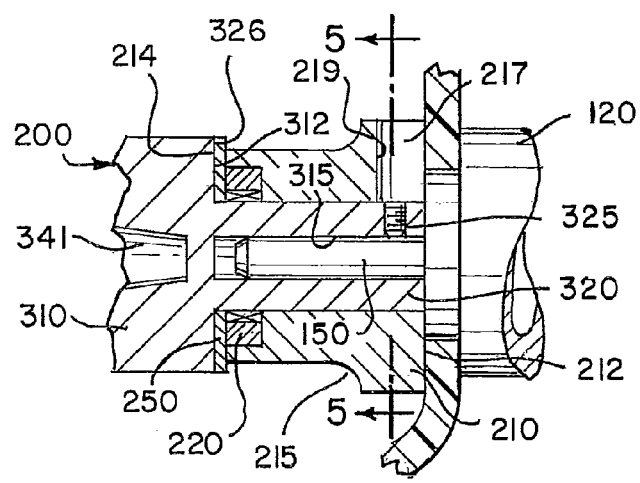
FIG. 3A is an enlarged cross-sectional view of a portion of the pencil sharpener assembly mated with a drive shaft of the motor of the power tool.

The motor 120 is operatively connected to a drive shaft 150. The drive shaft 150 transmits the rotation through a clutch, which regulates the drill's torque. Many drills have an adjustable clutch, some with as many as 24 settings. The higher the clutch setting, the higher the torque a drill puts out. When the drill reaches the preset clutch setting, the clutch disengages the drive shaft, allowing the motor to turn but not the drill or screwdriver bit. This results in a clicking sound. As shown in FIGS. 2 and 3A, the drive shaft 150 extends rearwardly beyond the rear end of the motor 120.

Wiring connects the various electrical components of the tool 100 and the tool 100 can include various safety features, such as a safety latch.

In some conventional drills, the portion of the drive shaft 150 that extends rearwardly from the motor is terminated in a bearing or the like.

In accordance with the present invention, the power tool 100 is configured so that it includes the integral pencil sharpener 200 within the housing 110. The cutting action of the pencil sharpener 200 is powered by the rotation of the drive shaft 150 and in particular and according to one embodiment, rotation of the drive shaft 150 in a first direction results in a cutting action, while rotation of the drive shaft 150 is the opposite direction does not result in a cutting action.

As best shown in FIGS. 2-3A, the pencil sharpener 200 includes a support block 210 with an internal bearing 220. The support block 210 is fixedly attached and held within the housing 110 with the internal bearing 220 being coupled to the drive shaft 150 such that rotation of the drive shaft 150 is translated into rotation of the internal bearing 220 within the support block 210. As shown in FIG. 2, the support block 210 can be a collar-shaped member that has a first end 212 and an opposite second end 214, with the first end 212 facing the motor 120. The illustrated support block 216 does not have a uniform diameter but rather, the first end 212 can have a greater diameter than the second end 214. As shown in FIG. 2, the support block 210 can have a tapered section 215 located between the two ends 212, 214.

The internal bearing 220 is sized and shaped to fit into the support block 210 at the second end 214 thereof. The internal bearing 220 is also constructed so that it permits passage of the drive shaft 150. For example, the internal bearing 220 can be a disk shaped (annular) member that includes a central opening to receive and permit the drive shaft 150 to pass therethrough.

At or near the first end 212, the support block 210 includes one or more slots 217. As shown, the slot 217 terminates at the first end 212 and consequently, the slot 217 is open at the first end 212. The slot 217 terminates at an opposite end with an edge or wall 219 that is spaced from the first end 212.

A first washer 250 can be provided and disposed at the second end 214 of the support block 210. The first washer 250 can be formed of any number of different materials. For example, the first washer 250 can be formed of a synthetic material or a metal. In the illustrated embodiment, the first washer 250 is formed of a nylon material.

The pencil sharpener 200 also includes a cutting assembly 300 that is operatively coupled to the rotating shaft 150 through the internal bearing 220. The cutting assembly 300 is in the form of an elongated member that has a first end 312 that faces and is closer to the motor 120 and an opposing second end 314 that faces an end 111 of the housing 110. The cutting assembly 300 is formed of a number of different parts and in particular, the cutting assembly 300 includes a post 320 at the first end 312 that has a central bore 315 for receiving the rear end of the drive shaft 150. In other words, the post 320 extends axially along the length of the cutting assembly 300 and is a hollow structure, with the central bore being sized to intimately receive the rear end of the drive shaft 150. The post 320 can thus have a cylindrical shape and the central bore can be circular in shape to receive the cylindrical shaped drive shaft 150.

The post 320 extends from a main cutting body or housing 310 that is centrally located within the cutting assembly 300. The main housing 310 has greater dimensions that the post 320. For example, both the main housing 310 and the post 320 can have cylindrical shapes with the main housing 310 having a greater diameter. A shoulder or interface 326 can be formed between the main housing 310 and the post 320.

The post 320 also includes a fastener 325 for coupling the cutting assembly 300 to the drive shaft 150. More specifically, the fastener 325 can be in the form of a set screw that can be manipulated and driven into contact with the drive shaft 150 that is received within the central bore of the post 320. The set screw 325 is advanced along inner threads that open into the central bore of the post 320 and therefore, the set screw 325 can be advanced into contact with the drive shaft 150. The length of the central bore defines the degree of travel of the drive shaft 150 and is selected so that when the cutting assembly 300 is fully inserted onto the drive shaft 150, the drive shaft 150 contacts a stop formed at the end of the central bore. Once the drive shaft 150 is properly positioned within the central bore, the set screw 325 can be driven into contact with the drive shaft 150 to fixedly couple the cutting assembly 300 (more particularly, the post 320) to the drive shaft 150.

The main housing 310 is a hollow member that is open at one end and includes an inner space or compartment 311 configured to receive the pencil tip and allow sharpening thereof. In particular, the main housing 310 is in the form of a conical shaped member that has a tapered construction (inwardly tapered in a direction toward the motor). In other words, the recess or opening formed within the main housing 310 is conically shaped.

The main housing 310 has an inner surface to which a cutting element 400 is fixedly attached. The cutting element 400 is contoured to have a cutting edge that just enters the conical shaped opening such that when a pencil is introduced into the interior of the main housing 310 of the cutting assembly 300, the cutting element 400 contacts and sharpens the tip of the pencil due to relative motion therebetween. The cutting element 400 can be attached to the inner surface within the recess using any number of conventional means, including using a fastener or bonding element or alternatively, the cutting element 400 can be integrally formed as part of the main housing 310.

The cutting assembly 300 can be formed of a number of different materials so long as they are suitable for sharpening a pencil. For example, the cutting assembly 300 can be formed of a metal, such as aluminum. The cutting element 400 can be formed of a material that is different than the material used to form the cutting assembly (housing 300). For example, the cutting element 400 can be formed of a carbide material. Alternatively, the housing 310 and cutting element 400 can be formed of the same material.

It will be appreciated that the cutting assembly 300 is configured so that it rotates under power of the motor and therefore, when the writing implement is inserted into the cutting assembly 300 (housing), the writing implement is held stationary, while the cutting assembly 300 rotates. This results in the cutting element 400 successively contacting different portions of the writing implement to cause the writing implement to be sharpened. In other words, the rotating blade (cutting element) 400 continuously contacts the writing implement and due to the design of the cutting element 400, the writing implement is sharpened. Thus, the cutting element 400 includes a cutting (sharpening) edge that sharpens the writing implement when it comes into contact therewith.

In one embodiment, as previously mentioned, the cutting element 400 can be constructed so that it only cuts (sharpens) when rotating in one direction, while rotation in the other direction, does not result in a sharpening of the writing implement. In another embodiment, the cutting element 400 can be constructed so that it cuts (sharpens) the writing implement when it rotates in ether the first direction or the second direction. Thus in the case of a two directional motor that is part of a power drill, operation of the drill in both a forward more and a reverse mode results in the writing implement being sharpened.

The cutting element 400 is formed of a robust material that can sharpen a pencil and in one embodiment, the cutting element 400 is made of a carbide material.

It will be appreciated that instead of having a separate housing 310 and cutting element 400, a unitary structure can be provided with the cutting element 400 being integrally formed with the housing 310 along the inner surface 341 thereof. In this embodiment, the unitary structure is formed of a material that provides the necessary cutting action. In other words, the inner surface of the housing of the cutting assembly 300 can include an integral blade member.

A second washer (not shown) can be provided and disposed adjacent the end 314 of the sharpener 300. The central opening of the washer would axially align with the open end of the housing 310 to allow the pencil to be received within the inner space of the housing 310. The second washer can be formed of any number of different materials. For example, the second washer can be formed of a synthetic material or a metal.

An end cap 500 is provided for guiding the pencil into the inner space of the housing 310. The end cap 500 can be a disk shaped member complementary to the shape of the end of the housing 110. The end cap 500 includes a central opening 510 that is in communication with the inner space of the housing 310 to permit the pencil to be received through the end cap 500 into the housing 110. The central opening 510 can have any number of different shapes, including a circular shape for receiving a traditional circular shaped pencil as shown in FIG. 6. Alternatively and as shown in FIG. 7, the central opening 510 can have a circular shape with a pair of side slots or notches 512 that extend radially outward from the central opening 510. The opening 510 and slots 512 are configured to receive a traditional flat carpenter's pencil.

When there is a second washer, the end cap 500 is positioned adjacent the second washer at end 314.

It will be appreciated that the end cap 500 can be of a removable type in that the end cap 500 can be an interchangeable part to permit the user to customize the pencil sharpener for a particular use. Any number of different means can be used to detachably couple the end cap 500 to the housing 110 of the tool 100. For example, a snap fit type attachment can be formed between the end cap 500 and the housing 110. Alternatively, fasteners, such as biased prongs can be used to clip the end cap 500 in place at the end of the housing 110.

As shown in FIG. 3, the end cap 500 can be threadingly fastened to the housing 110 to permit easy removal and interchanging thereof.

The end cap 500 can be formed of any number of different forms of materials including synthetic materials. In the illustrated embodiment, the end cap 500 can be formed of nylon.

The housing 110 can also include a means for disposing the shavings of a recently sharpened pencil. For example, the means can be in the form of a slot or opening 115 formed in the housing 110 to permit the shavings to fall from the tool 100. Alternatively, the means can be in the form of a pivotable tray or like that catches the shavings and then can be opened to permit removal of the caught shavings. For example, the tray is positioned underneath the cutting assembly 300.

Additionally, the inner wall of the housing can include one or more feature to direct the shavings in a prescribed manner to assist in collection and removal of the shavings. For example, the inner wall of the housing can include one or more fins of flanges that are shaped (angled) to direct the shavings toward a point of collection. Since by gravity, the shavings will fall toward the bottom of the housing, the top portion of the housing can have a contoured shape (rounded) to direct the shavings toward a bottom collection site.

It will also be appreciated that a protective member can be incorporated into the housing to prevent shavings from being sprayed toward the motor of the power tool. For example, a gasket, a wall or a bearing structure can be positioned within the housing between the motor and the cutting assembly (housing) 300 to prevent shavings from being lodged within the motor or related parts. FIG. 3 shows a wall being formed between the support block 210 and the motor 120 for protecting and shielding the motor from shavings.

It will be appreciated and understood that the cutting assembly 300 is merely one exemplary design for a cutting assembly and other cutting assemblies can be used. More specifically, the cutting assembly 300 can be broadly thought of as being a device that is operatively connected to a rotating element, drive shaft, such that rotation of the rotating element is translated into rotation of the cutting assembly 300 and cutting of the writing implement. The present invention thus covers other cutting assembly designs that can be coupled to the rotating drive shaft.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A power tool comprising:
   a housing having a handle and a first opening formed therein;
   a motor contained within the housing; and
   a device for sharpening a writing implement, the sharpening device being at least partially contained within the housing and accessible through the first opening which permits the writing implement to be inserted into the sharpening device, the sharpening device being operatively connected to the motor such that operation of the motor drives the sharpening device;
   wherein the sharpening device includes at least one sharpening blade that is configured to sharpen the writing implement when placed in contact therewith and when the motor is operated at least in one direction, the sharpening blade being disposed within the housing and rotates relative to the housing.

2. The power tool of claim 1, wherein the power tool comprises a drill.

3. The power tool of claim 1, wherein the writing implement comprises a round or flat pencil.

4. The power tool of claim 1, wherein the first opening is formed in a rear portion of the housing.

5. The power tool of claim 1, wherein the motor includes a drive shaft, the sharpening device being operatively connected to the drive shaft such that rotation of the drive shaft causes rotation of a sharpening element of the sharpening device.

6. The power tool of claim 1, wherein the motor is operable in first and second directions and the sharpening device is operably connected to the motor such that operation of the motor in the first direction results in the sharpening device operating in a sharpening mode, while operation of the motor in the second direction results in the sharpening device operating such that the writing implement is not sharpened.

7. The power tool of claim 6, wherein the power tool comprises a drill and the motor includes a drive shaft with the first direction being a forward driving mode and the second direction being a reverse driving mode.

8. The power tool of claim 1, wherein the sharpening device is coupled to the drive shaft by means of at least one bearing assembly.

9. The power tool of claim 1, further including an end cap that is detachably coupled to the rear portion of the housing, the end cap having a shaped opening for receiving the writing implement, the shaped opening being axially aligned within an internal cavity of the sharpening device, wherein the sharpening device includes at least one sharpening blade that extends within the internal cavity to permit contact with the writing implement inserted therein.

10. The power tool of claim 9, wherein the shaped opening is circular with a pair of slots that extend radially outward from a center opening to permit reception of both a circular writing implement and a flat writing implement.

11. A power tool comprising:
    a housing having a first opening formed therein;
    a motor contained within the housing;
    a device for sharpening a writing implement, the sharpening device being at least partially contained within the housing and accessible through the first opening which permits the writing implement to be inserted into the sharpening device, the sharpening device being operatively connected to the motor such that operation of the motor drives the sharpening device; and
    an end cap that is detachably coupled to the rear portion of the housing, the end cap having a shaped opening for receiving the writing implement, the shaped opening being axially aligned within an internal cavity of the sharpening device, wherein the sharpening device includes at least one sharpening blade that extends within the internal cavity to permit contact with the writing implement inserted therein;
    wherein the end cap is snap fittingly attached to the housing.

12. A power drill comprising:
    a housing having a handle and a first opening formed therein along a rear portion of the housing and a second opening formed in a forward portion of the housing;
    a drill chuck that is coupled to the forward portion of the housing and extends outwardly therefrom and is configured to receive a drill bit;
    a motor contained within the housing, the motor having a rotating drive shaft, the drill chuck being operatively coupled to the motor;
    an internal device for sharpening a writing implement, the sharpening device having a blade that is contained within the housing and accessible through the first opening which permits the writing implement to be inserted into the sharpening device, the sharpening device being operatively connected to the motor such that operation of the motor drives the sharpening device in such a way to permit sharpening of the writing implement; and
    an end cap that is detachably coupled to and in direct contact with the rear portion of the housing such that the internal device is closed off and is contained within housing, with the blade rotating relative to the housing, the end cap having a shaped opening for receiving the writing implement, the shaped opening being axially aligned within an internal cavity of the sharpening device.

13. The power drill of claim 12, further including a first bearing and a second bearing, the first bearing being disposed between a first end of the sharpening device and the drive shaft, the second bearing being disposed between a second end of the sharpening device and the rear portion of the housing.

* * * * *